3,395,039
PROCESS FOR RENDERING POROUS ARTICLES WATER-REPELLENT

John R. Leebrick, Lyme, Conn., assignor to Chas. Pfizer & Co., Inc., New York, N.Y., a corporation of Delaware
No Drawing. Filed Sept. 29, 1965, Ser. No. 491,401
16 Claims. (Cl. 117—135.5)

ABSTRACT OF THE DISCLOSURE

Water-repellent porous solids based on a polymeric coating of a hydrolyzed organotin compound of the formula:

$$R_nSn(OR')_{4-n}$$

wherein $n$ is an integer from 1 to 2; and R and R' are hydrocarbon substituents selected from the group consisting of alkyl, alkenyl, alkynyl, cycloalkyl, cycloalkenyl, mono- and bicyclic aryl and alkaryl of up to 18 carbon atoms.

---

This invention relates to a method of producing a high degree of water repellency. More particularly, it relates to a product made water-repellent which comprises a porous solid having on at least one surface thereof a polymeric coating of a hydrolyzed organotin compound, said organotin compound being of the formula:

$$R_nSn(OR')_{4-n}$$

wherein $n$ is an integer from 1 to 2; and R and R' are hydrocarbon substituents selected from the group consisting of alkyl, alkenyl, alkynyl, cycloalkyl, cycloalkenyl, mono- and bicyclic aryl and alkaryl of up to 18 carbon atoms.

When reference is made to the term porous solid, any solid of a porous nature is contemplated. Examples of this type of material include textiles, masonry, wood, paper, leather and other building or construction materials.

The ability of the herein disclosed process to provide water repellency for a desired porous solid resides in the ultimate formation of water-insoluble polymeric organotin oxides. Heretofore, there has been no practical method of incorporating these compounds uniformly into the aforesaid materials. Of course, the more porous the material the deeper will be the penetration. In fact, it is most preferred to have the greatest degree of penetration possible regardless of the type of material treated.

In accordance with the present invention, which discloses a method for rendering a porous solid water-repellent which comprises treating said solid with a dispersion of an organotin compound of the formula:

$$R_nSn(OR')_{4-n}$$

wherein $n$ is an integer from 1 to 2; R and R' are hydrocarbon substituents selected from the group consisting of alkyl, alkenyl, alkynyl, cycloalkyl, cycloalkenyl, mono- and bicyclic aryl and alkaryl of up to 18 carbon atoms; said organotin compound being present in an amount to provide from about 0.1% to about 5% by weight of the dispersion; and exposing said treated solid to a water-containing medium, organotin alkoxides serve as highly suitable intermediates. These organotin alkoxides once applied, can be activated to permit an in situ release of the resulting insoluble organotin oxides into selected porous solids as illustrated by the following reaction sequence:

$$mR_2Sn(OR')_2 + H_2O \longrightarrow \left[R_2SnO\right]_m + 2R'OH$$

or $$mRSn(OR')_3 + 3H_2O \xrightarrow{} \left[\underset{|}{\overset{O}{\overset{\|}{Sn}}}-O\right]_m + 3R'OH$$

wherein R and R' are as defined above. In the above reactions, water serves as the activator causing the desired polymeric organotin oxides to form. The water necessary to cause polymerization via a hydrolysis step may be provided in several ways. For example, the material treated with the organotin alkoxide may be immersed into water directly or it may be allowed to absorb the water from the atmosphere. Since the organotin alkoxides are extremely hydrophilic, the latter method may be the one of choice in many instances.

For illustrative purposes, the following examples will serve to describe both methods. A large sample of rayon acetate is immersed in a 2% by weight methanolic solution of dibutyltin dimethoxide, removed, dried, immersed in water and dried in vacuo. The specimen when used as a shower curtain indicated no wetting. Alternatively, a 4% solution of dibutyltin dimethoxide in kerosine is brushed on cedar shingles on a dwelling followed by overnight drying. The shingles treated thusly are highly resistant to wetting.

The organotin alkoxides as used in the instant invention are well known and their method of synthesis well-documented in the chemical literature. Preparation of compounds of the general type $R_2Sn(OR')_2$ is achieved by refluxing the appropriate di-substituted tin oxide with the desired alcohol in a suitable solvent. Rate of reaction is improved by azeotropic removal of the water liberated. Still another synthetic preparation which is more preferred, consists of reacting an appropriately di-substituted tin dihalide with an alkoxy derivative as shown hereinbelow:

$$R_2SnX_2 + 2NaOR' \rightarrow R_2Sn(OR')_2 + 2NaX$$

wherein R and R' are as defined above.

In connection with the novel process disclosed herein the aforementioned organotin alkoxides are initially dispersed in a suitable solvent. When reference is made to the term dispersion, it is intended to include both solutions as well as emulsions. Solvents which are suitable for solution preparations include kerosine, mineral spirits, aromatic hydrocarbons, alcohols, ethers and the like. Emulsion systems can be prepared utilizing non-ionic surfactants, aqueous PVA systems and the like. To determine whether a solvent or emulsion is more preferred, will depend on the nature of the porous solid to be treated. For instance, if the porous solid to be treated is a textile, the emulsion method of application will be preferred. On the other hand, for masonry, the solution application is more preferred.

Concerning the general class of organotin alkoxides utilized herein, a particularly valuable embodiment consists of those compounds wherein R and R' are both alkyl containing from 1 to 18 carbon atoms. Not only are these compounds easily prepared due to readily available starting materials, but many in addition to providing water-repellency also furnish an anti-microbial effect. This is particularly evidenced with those compounds in which R is alkyl containing from 2 to 6 carbon atoms. This utility will be particularly beneficial in the following applications:

paint primers
marine coatings
corrosion inhibition
brewery wall protection

While the dispersion containing the organotin alkoxide may be applied at organotin levels of between about 0.1% to about 5% by weight of the total dispersion, it is more preferred to have organotin levels of said dispersion between 2% and 4% by weight. The amounts used will, of course, vary with the particular material treated.

Once the material has been treated with the alkoxide dispersion, it is allowed to dry. It may be sufficient to effect the desired polymerization via hydrolysis by simply permitting the treated material to remain in a moist atmosphere, for example, moist air. On a practical basis, this would be the method of choice for a masonry and wood where the porous solids to be treated are large and heavy in character. However, when a textile is treated, it is much easier to simply dip the material into a water bath and allow it to dry. In any event, the mechanism for both is the same, only the mode of application being different.

In line with the mechanistic picture, it is apparent that the hydrocarbon R' substituent of the alkoxy moiety is not critical since hydrolysis breaks that bond, leaving an intermediate hydroxide which then polymerizes. Therefore, it is further apparent that any substitutent in place of alkoxy which can be converted to the short lived monomeric hydroxide will work as well. Indeed, this is actually the case when the following intermediates in lieu of organotin alkoxides are used.

Carboxylates: for example, diacetates, dilaurates
Halides: for example, dichlorides
Oxyhalides: for example, oxychlorides
Basic esters: for example, basic dilaurates Accordingly, once the substrate has been treated with a dispersion containing an organotin derivative illustrated above, the hydrolysis step may be carried out. In contrast to the method using an alkoxy derivative where only water is necessary, the hydrolysis step in this instance requires a basic hydrolysis, i.e. where the water solution contains a base. Any suitable basic substance is acceptable, for instance, sodium hydroxide, ammonium hydroxide etc. The need for a basic hydrolysis step most likely relates to the bond-breaking step. The base effects the basic hydrolysis of esters and permits conversion to the corresponding hydroxide intermediate. To illustrate, the basic hydrolysis of a disubstituted tin chloride is shown below:

$$R_2SnCl_2 + 2NaOH \longrightarrow \left[ R_2SnO \right] + 2NaCl$$

wherein R is as defined earlier.

The method for providing water-repellency disclosed herein may also be carried out in conjunction with other repellents, e.g., silicones, fluorocarbons, waxes, long-chain quaternaries, Werner complexes, etc. where a variety of desirabel properties may be obtained.

The following examples are provided by way of illustration and should not be interpreted as limiting the invention, many variations of which are possible without departing from the spirit or scope thereof.

Example I

A cotton swatch, 3 inches square, is immersed in a 2% by weight methanol solution of dibutyltin dimethoxide for 15 minutes. The swatch is then air-dried, immersed in water for 10 minutes, removed and dried in vacuo at 110° C. Drops of water applied to the surface assume a spherical shape and remain on the cloth until evaporation occurs without penetration. An untreated swatch wets through promptly. The treated specimen floats on water for more than 30 days whereas the control became saturated and sank within 15 minutes.

Example II

The procedure of Example I is repeated wherein dimethyltin dimethoxide is used in lieu of dibutyltin dimethoxide with comparable results.

Example III

The procedure of Example I is repeated wherein dibutyltin dibutoxide is used in lieu of dibutyltin dimethoxide with comparatble results.

Example IV

The procedure of Example I is repeated wherein dioctyltin dimethoxide is used in lieu of dibutyltin dimethoxide with comparable results.

Example V

The procedure of Example I is repeated wherein di-2-ethylhexyltin dimethoxide is used in lieu of dibutyltin dimethoxide with comparable results.

Example VI

The procedure of Example I is repeated wherein didodecyltin dimethoxide is used in lieu of dibutyltin dimethoxide with comparable results.

Example VII

The procedure of Example I is repeated wherein dioctadecyltin dimethoxide is used in lieu of dibutyltin dimethoxide with comparable results.

Example VIII

The procedure of Example I is repeated wherein butyltin trismethoxide is used in lieu of dibutyltin dimethoxide with comparable results.

Example IX

The procedure of Example I is repeated wherein diphenyltin dimethoxide is used in lieu of dibutyltin dimethoxide with comparable results.

Example X

The procedure of Example I is repeated wherein the following percent by weight solutions of dibutyltin dimethoxide are used and products exhibiting a high degree of water-repellency are obtained in each instance:

0.125%
0.25%
0.5%
1.0%
4.0%
5.0%

Example XI

The procedure of Example I is repeated wherein the following organotin alkoxides are used in place of dibutyltin dimethoxide with comparable results:

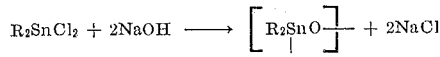

$R_nS_n(OR')_{4-n}$

| n | R | R¹ |
|---|---|---|
| 1 | t-butyl | $CH_3-$ |
| 1 | Phenyl | $\begin{array}{c} CH_2-CH_2 \\ CH_2 \quad CH- \\ CH_2-CH_2 \end{array}$ |
| 1 | Octadecenyl | $C_2H_5-$ |
| 1 | $HC\equiv C-$ | $C_4H_9-$ |
| 1 | $CH_3-C\equiv C-CH_2-$ | $C_{12}H_{25}-$ |
| 1 | ⬡$-CH_2-$ | $H\equiv C-CH_2-$ |
| 1 | ⬡ | ⬡ |
| 1 | ⬡$-$ | $C_{18}H_{37}-$ |
| 1 | ⬡$-$ | $C_6H_{13}-$ |

| n | R | R¹ |
|---|---|---|
| 1 | CH₃\CH—/CH₃ | CH₃— |
| 1 | CH₃\CH—CH₂—/CH₃ | ⟨phenyl⟩— |
| 2 | CH₃—C=C—CH₂— | C₄H₉— |
| 2 | CH₂=CH—CH₂ | C₈H₁₇— |
| 2 | cyclopentyl-CH— | C₂H₅— |
| 2 | CH₃—⟨phenyl⟩— | ⟨phenyl⟩— |
| 2 | Dodecenyl | C₁₀H₂₁— |

Example XII

A treated cotton swatch prepared as outlined in Example I is immersed in perchloroethylene for 30 minutes with agitation followed by drying. No loss in repellency is observed, indicative of the high degree of durability.

Example XIII

A cotton swatch, 3 inches square, is immersed in a 2% by weight methanolic solution of di-octyltin dimethoxide for 15 minutes, then air dried for 2 hours. The resulting sample is highly resistant to wetting. This experiment indicates that moisture from the air may be suitable without direct immersion.

Example XIV

A large sample of rayon acetate is immersed in a 2% solution of dibutyltin dimethoxide in methanol, air dried, immersed in water and dried in vacuo. The specimen when used as a shower curtain showed no wetting whereas an untreated control became saturated.

Example XV

A kerosine solution containing 2% by weight of dibutyltin dimethoxide is applied to a common red brick by brushing. The brick is air dried overnight and tested by application of 0.5 ml. water drops. Whereas the water was absorbed by the untreated control in less than 10 seconds, it remained on the treated brick until evaporation occurred.

Example XVI

Results similar to that obtained in Example XV are obtained when the following amounts by weight of dibutyltin dimethoxide are used:

0.125%
0.25%
1.0%
4.0%
5.0%

Example XVII

The procedure of Example XV is repeated wherein the following organotin alkoxides are used in place of dibutyltin dimethoxide with comparable results:

dimethyltin dimethoxide
dibutyltin dibutoxide
dioctyltin dimethoxide
di-2-ethylhexyltin dimethoxide
di-dodecyltin dimethoxide
di-octadecyltin dimethoxide
butyltin trimethoxide
diphenyltin dimethoxide

Example XVIII

A pine strip is immersed in a 4% by weight solution of dibutyltin dibutoxide in kerosine and air dried overnight. A high degree of water resistance is observed.

Example XIX

Redwood picnic benches and chairs are rendered highly water repellent by application of a 4% by weight solution of dioctyltin dimethoxide in kerosine followed by air drying.

Example XX

A 4% by weight solution of dibutyltin dimethoxide in kerosine is brushed on cedar shingles on a dwelling followed by overnight drying. The shingles are highly resistant to wetting whereas untreated shingles absorb water immediately.

Example XXI

A leather specimen is rendered highly water-repellent by the brush application of a 2% by weight solution of dibutyltin dimethoxide in methanol followed by overnight air drying.

Example XXII

Treated cotton swatch specimens as prepared by the procedure of Example I wherein 1% and 2% solutions of dibutyltin dimethoxide were utilized, are evaluated for antimicrobial activity by placing 11 mm. disks taken from the samples on nutrient agar inoculated with *Staphylococcus aureus* and *Aspergillus niger* followed by incubation and recording the zone of inhibition. The following results are obtained:

ZONE OF INHIBITION (MM.)

| Repellent Concentration, percent | *Staphylococcus aureus* | *Aspergillus niger* |
|---|---|---|
| Control | 0 | 0 |
| 1 | 17 | 16 |
| 2 | 16 | 13 |

The antimicrobial activity resulting from the above treatment is thus apparent.

Example XXIII

The procedure of Example XXII is repeated wherein specimens are treated similarly except the following organotin alkoxides are used with comparable results:

diethyltin dimethoxide
dipropyltin dibutoxide
dipentyltin dimethoxide
dihexyltin dimethoxide

Example XXIV

Cotton swatches, 3 inches square, are made water-repellent via the emulsion type treatment using the formulations described below in the following manner:

Formulation A:                                    Parts by weight
  Dioctyltin dimethoxide (20% by wt. in xylene) _____ 10
  Polyvinyl alcohol (7% by wt. in water) _____ 12
  Water _____ 78

Formulation B:
  Dibutyltin dimethoxide (18.4% by wt. in xylene) _____ 11
  Polyvinyl alcohol (7% by wt. in water) _____ 12
  Water _____ 77

Formulation C:
  Dioctyltin dimethoxide (8% by wt. in xylene) _____ 24.5
  Non-ionic surfactant-ethylene oxide adducts of nonylphenol _____ 2.0
  Water _____ 73.5

The above formulations are emulsified in a Waring Blendor and the cloth specimen is immersed in the prepared emulsions and repeatedly squeezed mechanically to force the emulsion into the fiber. The cloth swatch is then finally squeezed, dried in vacuo at 120° C., rinsed thoroughly with water and re-dried. The specimens treated in this manner exhibit excellent water-repellency.

What is claimed is:

1. A method for rendering a porous solid water-repellent which comprises treating said solid with a despersion of an organotin compound of the formula:

$$R_nSn(OR')_{4-n}$$

wherein $n$ is an integer from 1 to 2; R and R' are hydrocarbon substituents selected from the group consisting of alkyl, alkenyl, alkynyl, cycloalkyl, cycloalkenyl, mono- and bicyclic aryl and alkaryl of up to 18 carbon atoms; said organotin compound being present in an amount to provide from about 0.1% to about 5% by weight of the dispersion; and exposing said treated soild to a water-containing medium.

2. The method of claim 1 wherein said dispersion is a solution.

3. The method of claim 1 wherein said dispersion is an emulsion.

4. The method of claim 1 wherein said medium is water.

5. The method of claim 1 wherein said medium is moist air.

6. A water-repellent porous solid product which comprises a porous solid having on at least one surface thereof, a polymeric coating of a hydrolyzed organotin compound, said organotin compound being of the formula:

$$R_nSn(OR')_{4-n}$$

wherein $n$ is an integer from 1 to 2; R and R' are hydrocarbon substituents selected from the group consisting of alkyl, alkenyl, alkynyl, cycloalkyl, cycloalkenyl, mono- and bicyclic aryl and alkaryl of up to 18 carbon atoms.

7. The product of claim 6 wherein said organotin compound is diphenyltin dimethoxide.

8. A water-repellent porous solid product which comprises a porous solid having on at least one surface thereof a polymeric coating of a hydrolyzed organotin compound, said organotin compound being of the formula:

$$R_nSn(OR')_{4-n}$$

wherein $n$ is an integer from 1 to 2; and R and R' are alkyl containing from 1 to 18 carbon atoms.

9. The product of claim 8 wherein said organotin compound is dimethyltin dimethoxide.

10. The product of claim 8 wherein said organotin compound is di-n-butyltin dimethoxide.

11. The product of claim 8 wherein said organotin compound is di-n-butyltin dibutoxide.

12. The product of claim 8 wherein said organotin compound is di-n-octyltin dimethoxide.

13. The product of claim 8 wherein said organotin compound is di-2-ethylhexyltin dimethoxide.

14. The product of claim 8 wherein said organotin compound is didodecyltin dimethoxide.

15. The product of claim 8 wherein said organotin compound is dioctadecyltin dimethoxide.

16. The product of claim 8 wherein said organotin compound is n-butyltin trismethoxide.

References Cited

UNITED STATES PATENTS

| 2,798,862 | 7/1957 | Tomka et al. | 260—429.7 X |
| 2,957,785 | 10/1960 | Leatherland | 117—135.5 |
| 3,222,158 | 12/1965 | Sowa | 106—151 X |

FOREIGN PATENTS

| 921,057 | 3/1963 | Great Britain. |

JAMES A. SEIDLECK, *Primary Examiner.*

L. HAYES, *Assistant Examiner.*